United States Patent [19]

Hayatdavoudi

[11] Patent Number: 4,809,791
[45] Date of Patent: Mar. 7, 1989

[54] REMOVAL OF ROCK CUTTINGS WHILE DRILLING UTILIZING AN AUTOMATICALLY ADJUSTABLE SHAKER SYSTEM

[75] Inventor: Asadollah Hayatdavoudi, Mountain View, Calif.

[73] Assignee: The University of Southwestern Louisiana, Lafayette, La.

[21] Appl. No.: 153,317

[22] Filed: Feb. 8, 1988

[51] Int. Cl.$^4$ .................. E21B 21/06; E21B 44/00
[52] U.S. Cl. ........................ 175/40; 175/66; 175/206; 175/207; 175/48; 210/143; 210/739
[58] Field of Search .................. 175/40, 46, 48, 66, 175/84, 206, 207; 210/143, 739, 741, 742

[56] References Cited

U.S. PATENT DOCUMENTS

| | | | |
|---|---|---|---|
| 4,378,056 | 3/1983 | Gay, Jr. | 175/206 |
| 4,413,511 | 11/1983 | Godbey | 175/48 |
| 4,587,024 | 5/1986 | Hayatdavoudi | 210/143 |
| 4,635,735 | 1/1987 | Crownover | 175/48 |
| 4,708,212 | 11/1987 | McAuley et al. | 175/48 |
| 4,733,233 | 3/1988 | Grosso et al. | 175/48 |
| 4,750,920 | 6/1988 | Manuel et al. | 210/400 |

OTHER PUBLICATIONS

SPE Paper 14383 entitled "Downhole Solids Control: A New Theory and Field Practice" by A. Hayatdavoudi, Prepared for Presentation at the 60th Annual Technical Conference and Exhibition of the Society of Petroleum Engineers Held in Las Vegas, Nev., Sep. 22–25, 1985.

Derrick Manufacturing Corporation, Catalog KB-0186, entitled "The Derrick Model K & B Multifeed Wet Sizing Screens".

Primary Examiner—Stephen J. Novosad
Assistant Examiner—Terry Lee Melius
Attorney, Agent, or Firm—Laney, Dougherty, Hessin & Beavers

[57] ABSTRACT

A system is provided for the optimization of particle separation in a shaker system of a well drilling system. A well bore is drilled with a rotary drilling system. A stream of drilling fluid is circulated through the rotary drilling system to carry rock particles away from the bottom of the well bore as the well bore is formed. This stream of drilling fluid with the rock particles being carried therein is passed through a shaker system for separating the rock particles from the drilling fluid. A value of at least one, and preferably a plurality of operating parameters of the rotary drilling system are monitored, which parameters correlate to an average size of the rock particles being generated. The shaker system is adjusted in response to these monitored values, and more particularly in response to control signals computed based upon these monitored values, to increase separation of the rock particles by the shaker system.

37 Claims, 3 Drawing Sheets

REMOVAL OF ROCK CUTTINGS WHILE DRILLING UTILIZING AN AUTOMATICALLY ADJUSTABLE SHAKER SYSTEM

BACKGROUND OF THE INVENTION

1. Field Of The Invention

The present invention relates generally to the field of the drilling of wells such as oil and gas wells, and more particularly, relates to methods and apparatus whereby the removal of rock cuttings from a drilling fluid circulation system is improved.

2. Description Of The Prior Art

When a well is drilled with a conventional rotary drilling system, a stream of drilling fluid, commonly referred to as drilling mud, is circulated down through the drill string of the rotary drilling system, out through the rotary bit and then up through the well annulus to carry rock particles or cuttings away from the bottom of the well bore as the well bore is formed.

This stream of drilling mud with the rock cuttings carried therein is then passed through a shaker system for separating the cuttings from the liquid portion of the drilling mud and the very fine particles suspended therein, so that the drilling mud can be reconditioned and recirculated.

Typical prior art drilling systems make no attempt to predict or monitor the size of the cuttings generated during drilling, or to optimize removal of cuttings based upon a prediction or determination of cutting size.

SUMMARY OF THE INVENTION

The present invention provides a system for drilling a well which is adapted for use with a conventional rotary drilling system wherein a stream of drilling mud is circulated through the rotary drilling system to carry the rock cuttings away from the well bore.

By means of the present invention, values of one or more operating parameters of the rotary drilling system are monitored. These operating parameters correlate to an average size of the rock cuttings being generated during drilling. The average size usually, but not necessarily, follows a normal distribution.

Based upon predetermined relationships between the measured parameters and an estimated average cutting size or particle size, a control signal is generated by a suitable microcomputer system.

The shaker system of the present invention is an adjustable shaker system in which one or more of several adjustments may be made to increase separation of particles in response to the computed control signal.

Preferred relationships for predicting average particle size as a function of power input to the rotary drilling system, and/or as a function of power output from the rotary drilling system, are disclosed.

The present invention provides a means by which the rock particle size being generated can be predicted and adjustments to the shaker system can be made before the rock particles in question reach the shaker system, so as to increase the amount of rock particles removed on a first pass through the shaker system.

In some cases, subsequent actual measurements are made of the size of rock particles being delivered to the shaker system, and further adjustments to the shaker system are made in response to these actual measurements.

Numerous objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

General Description Of A Conventional Rotary Drilling System

Figure 1:
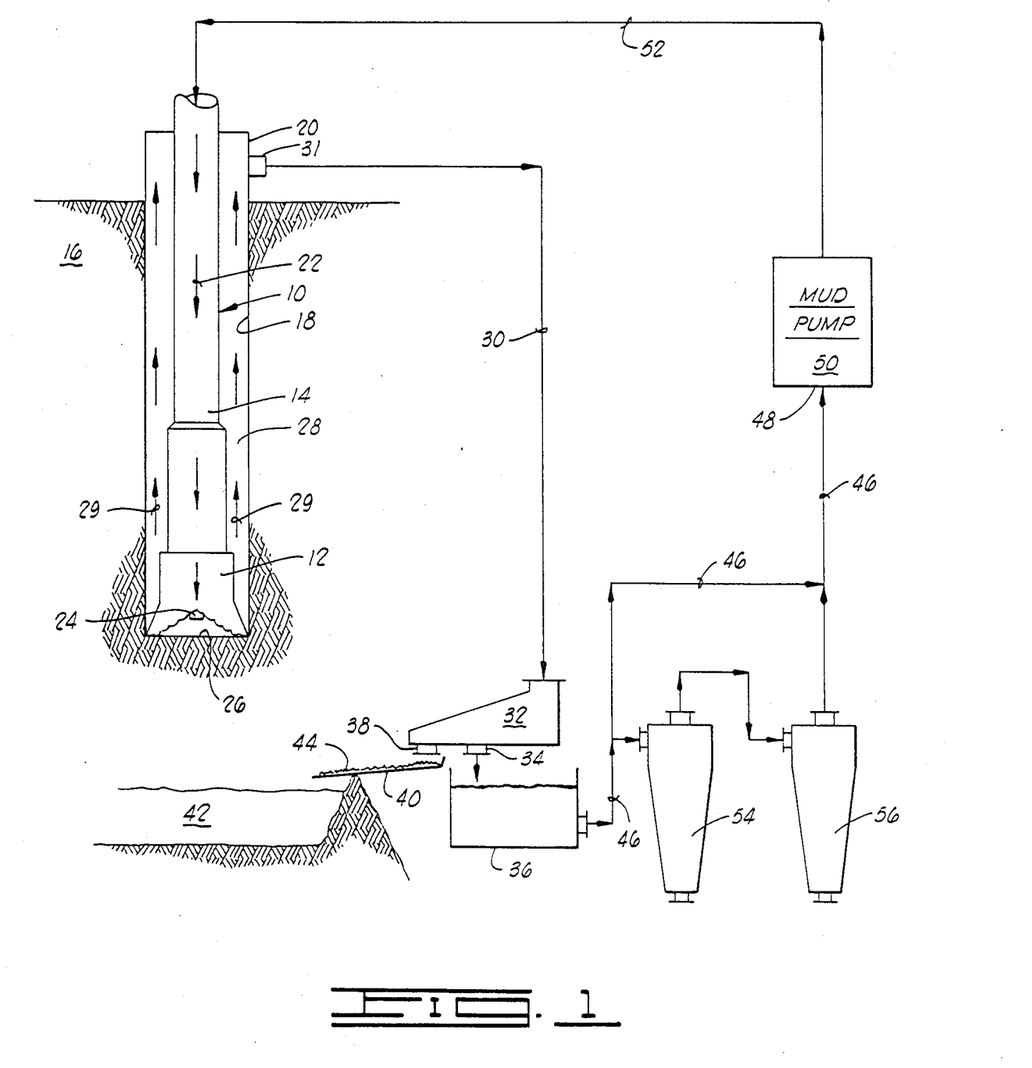
FIG. 1 is a schematic view showing a rotary drilling system, and the associated drilling fluid circulation system of a conventional rotary well drilling rig.

Referring now to FIG. 1, a conventional rotary drilling rig system is shown and generally designated by the numeral 10. The drilling system 10 includes a rotary bit 12 attached to the lower end of a length of hollow drill pipe 14 suspended from a drilling derrick (not shown).

The drill pipe 14 and attached drill bit 12 are rotated to cut into the subsurface formation 16 thus forming a well bore 18.

The drill pipe 14 passes through a well head assembly 20 located at the surface. The well head assembly 20 controls flow of drilling fluid into the well as is further described below.

During the drilling of the well, a drilling fluid commonly referred to as drilling mud is pumped down the interior of the hollow drill pipe 14 as indicated by the arrows 22. The drilling mud exits jets such as jet 24 in drill bit 12 and impinges upon a bottom 26 of the well bore 18.

The drilling fluid exiting the jets 24 flushes away from the bottom 26 of well bore 18 the cuttings or rock particles generated as the drill bit 12 cuts into the earthen formation 16.

This stream of drilling mud then carries the rock particles upward through a well annulus 28 as indicated by arrows 29 to the well head 20.

The drilling mud, with the rock particles carried or suspended therein, exits the well head 2 at outlet 31 and passes through a conduit 30 to a shaker system 32, commonly referred to as a shale shaker.

In the shaker 32, the drilling mud and rock particles are deposited upon a foraminous screen which is vibrated so that the larger rock particles are sifted out of the drilling mud.

The liquid portion of the drilling mud along with very fine suspended particles exits a first shaker outlet 34 and is received in a mud pit 36. The mud pit 36 typically is a large steel tank.

The larger rock particles which are sifted out of the stream of drilling mud exit a second shaker outlet or trough 38 and then slide down a shale slide 40 and are deposited into a reserve pit 42 or into storage tanks for haulage to another location. The large rock particles sliding down the shale slide 40 are indicated by the numeral 44.

The drilling mud is pumped from the mud pit 36 through suction line 46 which is connected to a suction side 48 of mud pump 50. The mud pump 50 then pumps the mud through discharge line 52 which returns it to the interior bore of drill pipe 14.

It will be appreciated by those skilled in the art that the mud pit 36 has been illustrated only in a very general manner. The mud pit 36, and additional associated pits, will typically have additional compartments separate from the one in which the drilling fluid is received from the shaker 32. In these additional pits and compartments, the mud is conditioned in various manners by various treatments and the addition of materials to reconstitute the mud to have the desired properties.

Furthermore, additional solids removal equipment such as desander 54 and desilter 56 may be utilized to remove smaller particles from the drilling fluid than can be removed by the shaker 32. Although not shown in FIG. 1, the liquid output from the desander 54 and desilter 56 may be directed back into the additional mud pits typically located downstream of pit 36.

The rotary drilling system just described is conventional and is a part of the prior art.

Theoretical Development Of The Preferred Predetermined Relationships Between Measured Well Operating Parameters And Rock Particle Size Various previous researchers have postulated different theoretical relationships between energy input and rock particle size reduction for use in the mining and mineral processing industries. A number of these are discussed and cited in "Prediction of Average Cutting Size While Drilling Shales" SPE/IADC Paper No. 16101 of Hayatdavoudi et al., presented at the 1987 SPE/IADC Drilling Conference held in New Orleans, La., Mar. 15-18, 1987, the details of which are incorporated herein by reference.

I have developed certain preferred theoretical relationships which can be utilized to establish predetermined relationships between estimated average particle size and either the power input to the drilling system or the power output from the drilling system.

One aspect in which these theoretical relationships are believed to be an improvement over relationships previously developed is that the theoretical determination of power input to the drilling system includes the hydraulic bit power input due to the hydraulic energy provided by the drilling fluid exiting the drill bit jets and impacting the bottom 26 of the bore hole.

These preferred theoretical relationships have been developed as follows. A more detailed explanation is provided in my SPE/IADC Paper No. 16101 cited above, the details of which are again incorporated herein by reference.

The penetration rate, i.e., the rate at which the drill bit 12 extends the depth of the well bore 18 into the formation 16, is a function of power input to the drilling system 10 and as such can generally be expressed as follows:

$$R = F(P_{in}) \quad \text{(Equation 1)}$$

where R=penetration rate and $P_{in}$=power input.

Power input is affected by a number of factors such as the weight on the drill bit 12, the rotary speed of the drill pipe 10 and drill bit 12, the torque applied to the drill bit 12, the radius of the drill bit 12, the jet impact force of the fluid exiting the nozzles 24 of the drill bit 12, the jet velocity of the fluid exiting the nozzles 24, and other factors. This power input to the drilling system can be expressed as follows:

$$P_{in} = [\text{mechanical bit power input}] + [\text{hydraulic bit power input}] \quad \text{(Equation 2)}$$

or $$P_{in} = [(WOB)(V_h) + (F_t)(Nr)] + [(F_j)(V_j)] \quad \text{(Equation 3)}$$

where:
WOB=weight on bit;
$V_h$=vertical component of velocity of tooth of drill bit 12 impacting the rock at the bottom 26 of the well bore 18;
Ft=force due to torque input;
N=rotary speed of drill pipe 14 and drill bit 12;
r=bit radius;
$F_j$=jet impact force; and
$V_j$=jet velocity.

The inclusion of the hydraulic bit power input in Equations 2 and 3 has been neglected by prior workers in the field. This part of the total power input and the mechanical bit power input both contribute to the total power available at the interface between bit 12 and the bottom 26 of well bore 18 to break the rock grains or cement between rock grains and produce chips. Field experience showing that in relatively soft formations, the hydraulic jet action of the bit 12 may in some instances destroy the rock before the actual tooth-rock contact between the bit 12 and the rock supports the inclusion of this hydraulic bit power input in the total power input available to destroy the rock and form chips.

Assuming the energy balance equation holds, the sum of the power input can be equated to the sum of power output as follows:

$$P_{out} = P_{in} \quad \text{(Equation 4)}$$

The power output, $P_{out}$, is a function of work done on the rock grain, cross-flow velocity, distance from the center of the jet impact area to the center of the bit 12, thermal expansion force of the rock, cutting size (diameter), cutting collision force, and cutting compressive, tensile, and shear strength and stresses around the well bore. Since the power output due to many of these factors is not well documented, those effects can be represented by constants A and B in the following relationship:

$$P_{out} = \left[ A \frac{(V_{cr})(W)}{(X)} \right] + B \left[ (F_h) \frac{(d)}{(t)} \right] \quad \text{(Equation 5)}$$

where:
$V_{cr}$=cross flow velocity;

W = work done on the rock grains to break the cements and other bonds and expand the pores and bring the rock fragments to a certain size;

X = distance from the center of the jet impact area to the center of the bit;

$F_h$ = thermal expansion force;

d = average cutting size; and t = unit time (when the distance, x, between the center of jet impact and the center of the bit is known, and knowing the cross flow velocity $V_{cr}$; t = (x/$V_{cr}$); or t can be estimated as one second.)

Since power input has been equated to power output we can state that:

$$P_{in} = \left[ A \frac{(V_{cr})(W)}{(X)} \right] + B \left[ (F_h) \frac{(d)}{(t)} \right].$$ (Equation 6)

In order to simplify the model and make it easily understood for the purpose of practical application, Equation 6 can be transformed into the linear form:

$$Y_i = A + BX_i$$ (Equation 7)

which gives the following:

$$\frac{(P_{in})(X)}{(V_{cr})(W)} = A + B \frac{(F_h)(d)(X)}{(V_{cr})(W)(t)}$$ (Equation 8)

In order to test the theoretical relationship set forth in Equation 8 above, two detailed sets of field tests, one in Nigeria and one in Lafayette Parish, Louisiana, were analyzed for two different hole sizes. The results set forth below in Examples 1 and 2 show a good correlation between power input and average cutting size, and between power output and average cutting size.

EXAMPLE 1

Data were collected from an 8½-inch diameter hole drilled for the Manuso NE 1 well in Port Harcourt, Nigeria. To determine average drilled cutting size, the collected drilled cutting samples were screen sieve sized. The cumulative weight percent retained (oversize) was plotted against the respective mesh size of the screen sieves. Different curves were generated for each of the drilled cutting samples. From these curves the average drilled cutting size was determined for each example. Based upon this data and calculation of the various other factors found in Equation 8 above, the constants A and B for Equation 8 as applied to this example were found to be 0.0001196 and 87.92, respectively, so that Equation 8 can be restated for this example as follows:

$$\frac{(P_{in})(X)}{(V_{cr})(W)} = .0001196 + 87.92 \frac{(F_h)(d)(X)}{(V_{cr})(W)(t)}.$$ (Equation 9)

From this, the following relationships between power input and average particle size, and between power output and average particle size were developed:

$P_{in} = 77.1 + 2702d$ (Equation 10)
$P_{out} = (1.264 * 10^4) + (8.85 * 10^5) d$. (Equation 11)

EXAMPLE 2

For this example, data were collected for a 6⅜-inch diameter hole drilled for the E. B. Herbert No. 1 well in Scott, La. The constants A and B for Equation 8 were found to be 0.01124 and 6.28, respectively, so that Equation 8 becomes:

$$\frac{(P_{in})(X)}{(V_{cr})(W)} = .01124 + 6.28 \frac{(F_h)(d)(X)}{(V_{cr})(W)(t)}$$ (Equation 12)

From this relationship, the following correlations between power input and average particle size and between power output and average particle size were determined:

$P_{in} = 17.7 + 248.04d$ (Equation 13)

$P_{out} = (2.128 * 10^4) + (3.08 * 10^6)d$. (Equation 14)

The details of the work done in Examples 1 and 2 are much more completely explained in SPE/IADC Paper No. 16101 referenced above, which again is incorporated herein by reference. From these Examples 1 and 2, it was shown that the linear relationship postulated in Equation 8 does provide a good approximation of the actual relationship between power input and average particle size. It follows that with sufficient experience in a given geographic area and with sufficient information about a proposed well site, the constants A and B of Equation 8 can be estimated for the proposed well site, and predetermined relationships between power input and average particle size and between power output and average particle size, such as Equations 10, 11, 13 and 14 can be developed for the proposed well site.

Once such a relationship is developed, then measurements of the appropriate operating parameters of the drilling system 10 as the new well is drilled can be utilized to provide an on-site estimate of the average cutting size being generated as the well is being drilled.

To do so, one must measure the operating parameters necessary to calculate the various elements of either power input or power output as set forth in Equations 3 and 5, respectively, above.

For example, to calculate power input according to Equation 3, one must be able to measure or calculate WOB, $V_h$, $F_t$, N, r, $F_j$, and $V_j$. Of those elements, WOB, N and r can be directly measured. The others must be calculated according to the following formulae:

$$V_h = (2 \pi r)(RPM_c);$$ (Equation 15)

$$F_t = \frac{M}{r};$$ (Equation 16)

$$F_j = 0.01823 \, C_d \, Q \sqrt{\rho \Delta P_b} \; ; \text{ and}$$ (Equation 17)

$$V_j = \frac{Q}{C_d \, A_j}.$$ (Equation 18)

To calculate $V_h$ from Equation 15 above, the only variable measurement which must be made is $RPM_c$ which is the bit cone revolutions per minute. This can be determined for any particular rotary drill bit by a fixed relationship between $RPM_c$ and N, the rotational speed of the drill string 14 and drill bit 12. Thus, to calculate $V_h$ the operational parameter of the drilling system 10 which must be monitored is rotational speed of the drill string 14.

To calculate $F_t$ from Equation 16 above, the only variable operating parameter which must be monitored is torque, M, applied to the rotary drill string 14, which can be directly measured.

To calculate $F_j$, that is the hydraulic force of the fluid jets exiting nozzles 24 of drill bit 12, one must know the constant $C_d$ which is the discharge coefficient of the nozzle, and one must measure the operating parameters Q and $\rho$ which are the mud flow rate and mud density, respectively. One must also determine $\Delta P_b$, the pressure drop at the bit, which can be accomplished by the following formula 18.1:

$$P_b = \frac{\rho Q^2}{7430\, C_d^2\, d^4}, \quad \text{(Equation 18.1)}$$

where "d" is the nozzle diameter.

To calculate $V_j$, that is the impact velocity of the hydraulic jet exiting nozzles 24, one must know the constants $C_d$ and $A_j$, which is the area of the jet, and one must measure the operating parameter Q, that is the mud flow rate.

Thus, to calculate the mechanical bit power input according to Equations 2 and 3, one must monitor a plurality of operating parameters including weight on bit, rotational speed, and torque. Further, to calculate hydraulic bit power input accordingly to Equations 2 and 3, one must monitor a plurality of operating parameters including drilling fluid density and drilling fluid flow rate.

In a similar fashion, if it is desired to predict average rock particle size based upon a predetermined relationship between rock particle size and power output, such as for example like that shown in Equations 11 or 14, then sufficient operating parameters must be monitored from which the various elements set forth in Equation 5 can be calculated.

Looking at the first part of the right-hand side of Equation 5, namely the factor $(V_{cr}/x)\,W$, which is proportional to the power output due to the bit hydraulic jet action, one must know the constant X which is the distance from the center of the bit to the center of the jet impact area, and one must monitor appropriate operational parameters from which $V_{cr}$, the cross flow velocity, and W, the work done on the rock grains, can be calculated.

$V_{cr}$ and W can be calculated from the following equations:

$$V_{cr} = \frac{5.9}{D_H}\left[\frac{QV_j}{\# \text{ of nozzles}}\right]^{\frac{1}{2}}; \text{ and} \quad \text{(Equation 19)}$$

$$W = (WOB)(ROP) + 2\pi NM + \left(\frac{QP}{1714}\right)(t) \quad \text{(Equation 20)}$$

To calculate $V_{cr}$ according to Equation 19, one must know the constant $D_h$ which is the hole diameter; one must know the number of nozzles which obviously is a constant; one must know the constants $C_d$, and $A_j$ discussed above in order to calculate $V_j$; and one must monitor the operating parameter Q, namely the drilling fluid flow rate.

To calculate W according to Equation 20 above, one must monitor WOB (that is the weight on the bit 12), ROP (that is the rate of penetration of the drill bit 12), N (that is the rotary speed of the drill string 14), M (that is the torque applied to the bit 12), Q (the mud flow rate), and P (the pump pressure as measured at the stand pipe of the drilling rig). Also, the unit time, t, must be calculated or estimated as described above. Similarly, to calculate the second portion of the right-hand side of the power output in Equation 5, namely the term $F_h(d,/t)$ which is proportional to the power output due to heating caused by bit friction and impact, one must monitor t, that is the drilling time, and one must monitor sufficient operating parameters from which $F_h$, that is the thermal expansion force, can be calculated according to the following equation:

$$F_h = KEA\Delta T = 24A\Delta T \quad \text{(Equation 21)}$$

where:
$F_h$ = thermal expansion force (lbs);
K = thermal expansion coefficient (in)/(in-°F.)
E = Young's modulus (psi);
A = contact area of rock (in$^2$); and
$\Delta T$ = average temperature change (degrees F.).

The contact area, A, is the area of the tip of the bit tool that contacts the rock. This area varies with the type of bit used.

The average temperature change, $\Delta T$, is the difference between temperature at the earth's surface and temperature at the bottom of the well, which is calculated by knowing the thermal gradient for the particular geographic location of the well. As previously mentioned, the theoretical relationships between average particle size and either power input or power output were developed based upon the assumption set out in Equation 4 that power output is equal to power input. The relationship can more accurately be stated, however, by recognizing that all of the power input is not equated to power output, because there are among other things power losses experienced during the drilling 10 of the well. Thus, this accommodation for power loss can be represented as follows:

$$(P_{out})(K_H) = P_{in} \quad \text{(Equation 22)}$$

where $K_H$ is a correction factor which accounts for the difference between power input to the drilling system 10 and power output which is actually available to create and remove rock particles. Again, this difference represented by the correction factor $K_H$ is due at least in part to power losses experienced during the drilling of the well. These power losses would be due to friction, stresses initiating microfractures in the rock formation, creep of the well bore, ballooning of the well bore, and other recognized phenomena created by the drilling of the well which do not result in creation and displacement of rock particles.

Thus when the correction factor $K_H$ is included, Equation 6 above may be restated as follows:

$$P_{in} = \left[A\frac{V_{cr}}{X}W + BF_h\frac{d}{t}\right](K_H) \quad \text{(Equation 23)}$$

For any particular well site, the determination of $K_H$ may be based upon prior empirical data from experience in related geographical locations and/or calculation of various factors known to affect $K_H$.

While $K_H$, by definition, is a correction factor to account for many phenomena which are not completely understood, and some of which may not be presently appreciated at all, it will be understood that no all inclusive explanation can be given for the factors which can be included in such a correction factor. It is possible, however, to generally describe a number of physical phenomena which it is believed could be taken into account in the correction factor $K_H$.

It is believed that $K_H$ will correlate in a meaningful manner to the Biot constant which is the ratio of grain compressibility to bulk compressibility for the rock formation.

It is believed that $K_H$ will correlate in a meaningful manner to the ratio of shear velocity to compressional velocity through a given rock formation material, thus indicating the existence of fracture density in a naturally fractured reservoir.

It is believed that $K_H$ will correlate in a meaningful manner to the hardness and degree of cement bonding between the grains of the rock formation.

It is believed that $K_H$ will correlate in a meaningful manner to Archie's formation factor which is commonly used in electric log interpretation to calculate water or oil saturation of a given formation.

It is believed that $K_H$ will correlate in a meaningful manner to the confined or unconfined strength of the rock making up the formation.

It is believed that $K_H$ will correlate in a meaningful manner to the permeability, porosity, capillary pressure, and height to hydrocarbon-water contact plane for a given formation.

It is believed that $K_H$ will correlate in a meaningful manner to pore pressure in a given formation.

It is believed that $K_H$ will correlate in a meaningful manner to the degree of poro-elasticity and poro-plasticity of a given formation and to the amount of stresses naturally existing in a formation.

It is believed that $K_H$ will correlate in a meaningful manner to the amount of clays or volume of shale found in a formation.

It is believed that $K_H$ will correlate in a meaningful manner to the shape and contact area where stresses or energy are transferred by the bit 12 to the rock formation.

It is believed that $K_H$ will correlate in a meaningful manner to the drillability or machinability of a given material making up the rock formation.

Figure 5:
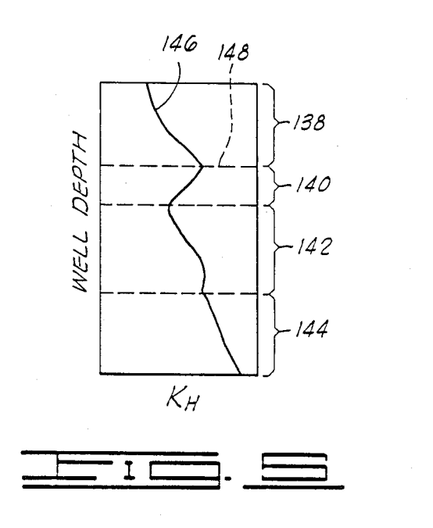
FIG. 5 schematically illustrates a computed well log displaying a correction factor, $K_H$, useful in the prediction of average particle size according to the relationships disclosed herein.

It is contemplated that with sufficient information, a prediction of $K_H$ for a given well drilling site can be prepared much in the form of a well log. Thus, the correction factor $K_H$ would be calculated as a function of depth for the particular well being drilled, and particularly would take into account the rock properties of the various geological strata or formations expected to be encountered as the particular well is drilled.

Such a well log of the correction factor $K_H$, which may be referred to as a power log or power lithology log, may look like that illustrated in FIG. 5.

In the well log of FIG. 5, which is intended to be shown in a graphical manner on an elongated sheet of paper such as typically used for the generation of other types of well logs, the correction factor $K_H$ is represented on the horizontal axis and the well depth is represented by the vertical axis. Along the vertical axis, several different geological strata are represented by the intervals 138, 140, 142, and 144.

The correction factor $K_H$ represented by the line 146 in FIG. 5 would be expected to vary with depth within any given geological strata, and to exhibit a change of trend at the interface between adjacent geological strata, such as the interface 148 between strata 138 and 140. These trends in turn are interpreted to obtain meaningful and economical information.

Detailed Description Of The Operational Aspects Of The Present Invention

Figure 2:
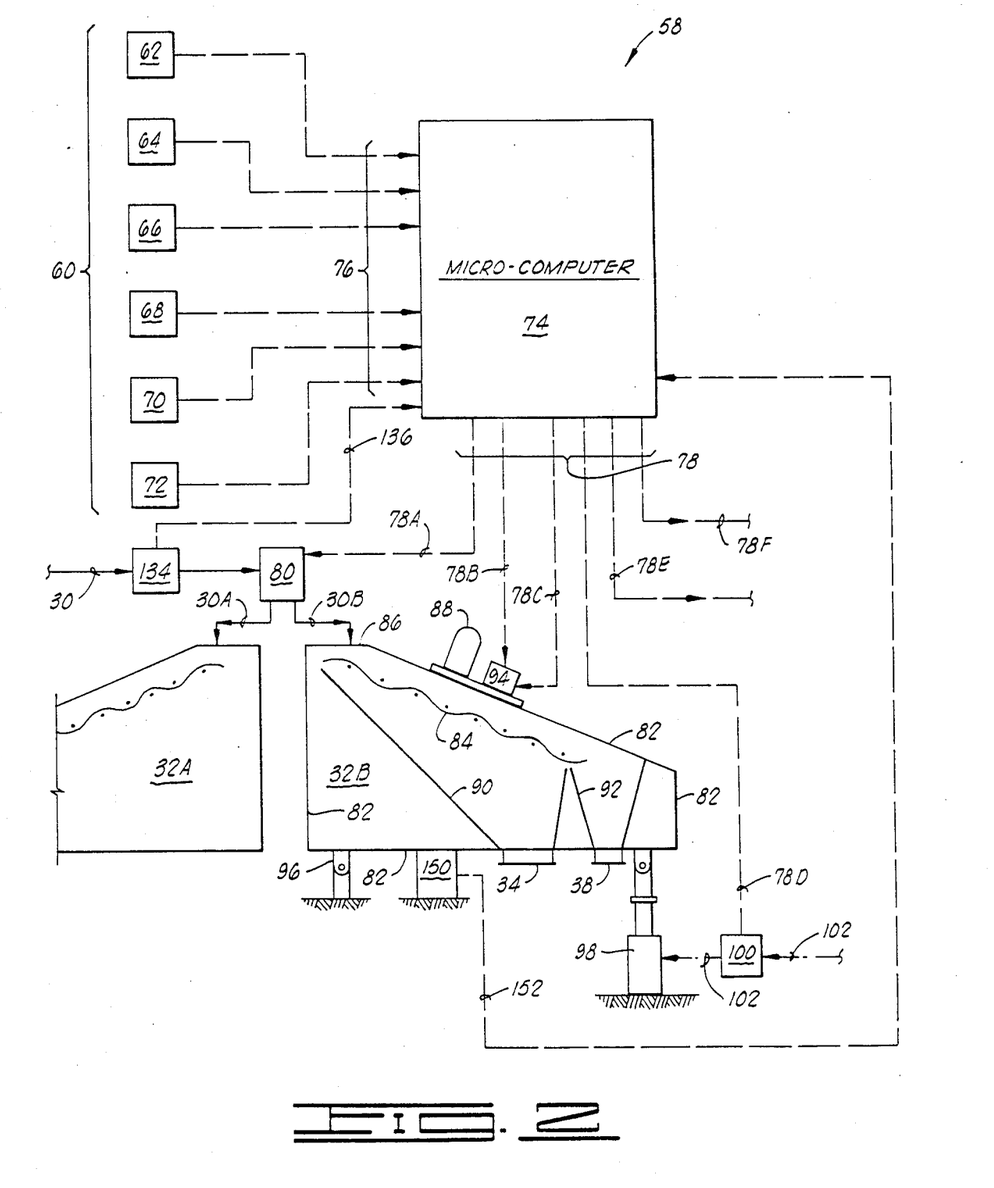
FIG. 2 is a schematic illustration of the various monitoring means utilized to monitor operating parameters of the well drilling system, the computer means for computing the control signals in response to the monitored parameters, and the control means associated with the shaker system for adjusting various features on the shaker system in response to the computed control signal.

Referring now to FIG. 2, the methods and apparatus of the present invention are there schematically illustrated. These methods and apparatus will now be described in reference to the structure shown in FIG. 2 and its interrelationship with the drilling system and mud circulating system of FIG. 1.

Figure 3:
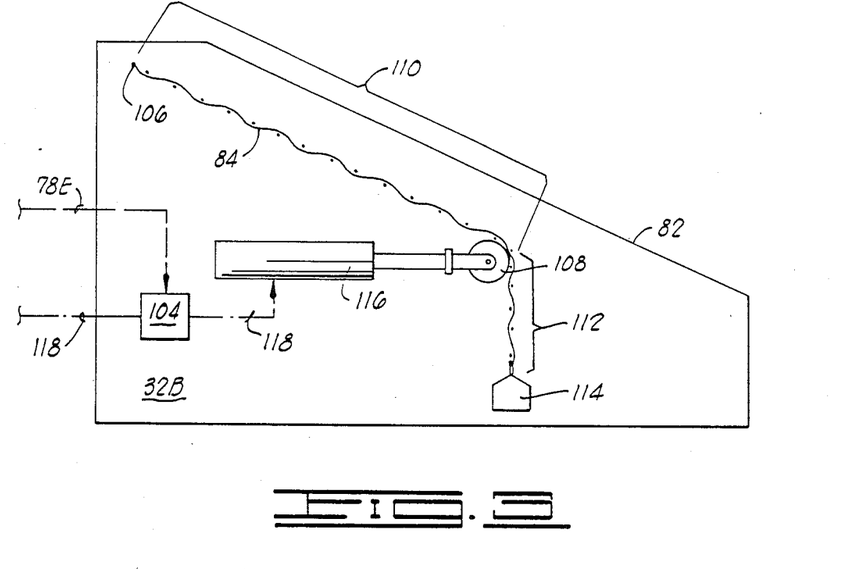
FIG. 3 is a schematic elevation lengthwise section view of a shaker apparatus having an adjustable bed length.
Figure 4:
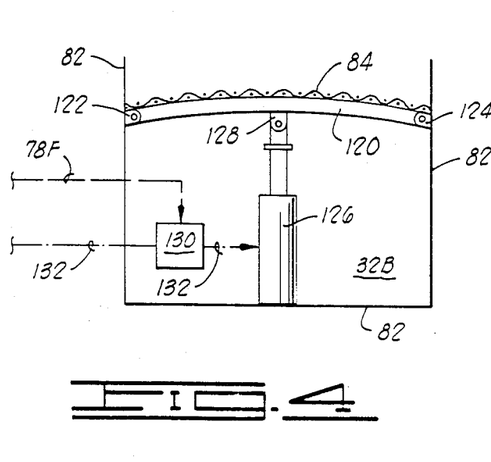
FIG. 4 is a schematic elevation widthwise cross-section view of a shaker system having an adjustment for screen tension.

It is noted that in FIGS. 1–4, several types of flow lines are schematically illustrated. Solid lines represent flow paths of the drilling fluid or drilling mud as previously described with regard to FIG. 1. Dashed lines and phantom lines as seen in FIGS. 2–4 represent electrical conduits and hydraulic conduits, respectively.

FIG. 2 can generally be described as schematically illustrating a shaker control system 58 for well drilling.

The shaker control system 58 includes a monitoring system means 60 for monitoring a value of a plurality of operating parameters of the well drilling system 10, which parameters correlate to an average size of rock particles being created during the formation of the well bore 18 as previously described with regard to FIG. 1. The monitoring system means 60 is illustrated in FIG. 2 as including first, second, third, fourth, fifth and sixth individual monitoring means 62, 64, 66, 68, 70 and 72.

Each of the individual monitoring means 62–72 are conventional sensors or transducers associated with conventional means for measuring the various operating parameters described below.

The first individual monitoring means 62 is a means for monitoring a value of the weight on the drill bit 12. This is a conventional measurement which is made at the drilling rig by measuring the weight of the drill string suspended from the derrick of the drilling rig.

The second individual monitoring means 64 is a means for monitoring the rotational speed of the drill string 14, which again is a conventional measurement made at the drilling rig.

The third individual monitoring means 66 is a means for monitoring the torque applied to the drill string 14 which again is a conventional measurement made at the drilling rig.

The fourth individual monitoring means 68 is a means for monitoring a value of drilling fluid density which may be made by an in-line densometer placed in the mud discharge line 52 of FIG. 1.

The fifth individual monitoring means 70 is a means for monitoring the drilling fluid flow rate which is preferably done by placing a flow meter in the mud discharge line 52 of FIG. 1.

The sixth individual monitoring means 72 is a means for monitoring the rate of penetration of the drill bit 12, which is another conventional measurement made at the drilling rig.

A seventh individual monitoring means (not shown) is a means for monitoring pump pressure at the stand pipe of the drilling rig. This is the pressure of the drilling fluid approximately at the earth's surface as it is pumped into the well.

Although the particular individual monitoring means 62–72 just described above have been referred to as first through sixth individual monitoring means, it will be appreciated that those designations first through sixth are used in this specification merely for purposes of ease of identification, and no order of priority is intended, nor do the designations first through sixth have any particular significance. Furthermore, in the appended claims, various designations such as first, second, etc., are utilized to specify certain preferred operating parameters which are desired to be monitored in connection with the apparatus or method of particular claims, and the identifiers such as first, second, etc., utilized in the claims do not necessarily correspond to the identifiers first, second, etc., described above for the individual monitoring means 62–72. Correlation of the particular individual monitoring means specified in the claims, with the individual monitoring means 62–72 described above, must be made by reference to the functional description of the monitoring means and not by the numerical identifiers such as first, second, etc.

A computing means 74 which is preferably a suitable microcomputer 74 is operably associated with the monitoring system means 62. A plurality of electrical input conduits 76 transmit input signals from the monitoring system means 60 to the computer 74. Also, in some cases, the individual monitoring means 62–72 will have suitable signal conditioning devices associated therewith such as analog-to-digital converters for conditioning the signals generated by the individual monitoring means and placing them in appropriate form for input to the microcomputer 74.

The microcomputer 74 is programmed for computing a control signal, based upon the input signals from the monitoring system means 60, which control signal correlates to an estimated average size of the rock particles being generated as the drill bit 12 creates the well bore 18.

It will be appreciated by those skilled in the art that it may not be necessary in any particular application for the computer 74 to actually calculate the estimated average size of the rock particles or to display that information in any output which is humanly discernible. Rather, what is generally desired is that the computer 74 generate a control signal which correlates to an estimated average size of the rock particles, based upon some predetermined relationship between the estimated average size of the rock particles and the various operating parameters being monitored by the monitoring system means 60.

Preferably, but not necessarily, the microcomputer 74 will generate its control signal based upon one of the predetermined relationships between either power input or power output and the average particle size generated as described above. As has been noted, however, there are other theoretical relationships between rock particle size and various well operating parameters, which could be utilized in the broadest context of the present invention.

The control signal or signals generated by the computer 74 are conveyed by one or more of the electrical output conduits 78 to one or more automatic control means associated with the adjustable shaker means 32.

For reasons which are explained below, the shaker means 32 is illustrated in FIG. 2 as including first and second shaker apparatus 32A and 32B.

There are a number of features of the shaker means 32, the adjustment of which could enhance the separation of rock particles therein. The present invention specifically contemplates that adjustment be made to one or more of the following parameters, namely screen opening size, vibration amplitude, vibration frequency, bed tilt angle, bed length, or screen tension.

It should first be noted that shaker apparatus of the prior art do not provide means for varying any of these parameters. Prior art shaker means typically do not include any means of adjustment, other than the possibility of manually changing out the screens in a shaker so as to change the screen opening size, and also screen tension can be manually adjusted by tightening of bolts associated with the screens.

FIGS. 2, 3 and 4, along with the following description, illustrate the manner in which existing shaker apparatus may be modified so as to provide the necessary adjustments contemplated by the present invention.

For example, adjustment of screen opening size may be provided through the use of first and second individual shaker apparatus 32A and 32B, each having different screen opening sizes.

A first automatic control means 80, which includes an electrically operated hydraulic control valve is placed in the fluid conduit 30 through which the stream of drilling fluid carrying the cuttings from the well bore 18 flows to the shaker apparatus 32. An electrical control signal generated by the computer 74 is transmitted through the electrical output conduit 78A to the first automatic control means 80. Depending upon the screen opening size which is preferred as indicated by the control signal conveyed by electrical output conduit 78A, the first automatic control means 80 will act to appropriately divide the flow stream of drilling fluid between shaker apparatus 32A and 32B, or to completely divert the stream of drilling fluid and rock particles to either shaker apparatus 32A or 32B.

It will be appreciated by those skilled in the art, that the first automatic control means 80 may have associated therewith suitable signal conditioning means such as a digital-to-analog converter so that the control means 80 may operationally interface with the computer 74. The same will be true for the various other automatic control means described below, and it will not be necessary to repeat this explanation.

As mentioned, other features of the shaker apparatus 32 which may desirably be varied are vibration amplitude and/or vibration frequency.

To understand how this would be done, a brief explanation of the typical shaker apparatus is in order. Referring for example to FIG. 2, the shaker apparatus 32B includes a rigid framework shown in outline form and designated by the numeral 82. A foraminous bed or screen 84 is attached to the frame 82 and is tilted to the horizontal as seen in FIG. 2. The stream of drilling fluid carrying rock particles therein enters the shaker apparatus 32B through inlet 86 and is deposited upon the screen 84. An electrically driven vibrator apparatus 88 is attached to the frame 82 and shakes the frame 82 along with the attached screen 84. This causes the rock particles to be sifted from the stream of drilling fluid. The liquid portion of the drilling fluid along with the finer suspended particles that can pass through the screen 84 falls into a first bin 90 and exits the first shaker outlet 34 previously described with regard to FIG. 1. The larger rock particles which are separated by the screen 84 tumble down the inclined screen 84 into a second bin 92 which directs them to the second shaker outlet 38 again previously described with regard to FIG. 1.

In order to adjust the vibration amplitude and/or vibration frequency, a second automatic control means 94 can be provided in association with the vibrator 88. The second automatic control means 94 can vary the vibration amplitude generated by the vibrator 88, such as by displacement of an eccentric weight rotated by the vibrator 88, in response to an electrical control signal conveyed by second electrical output conduit 78B. The second automatic control means 94 also can vary the vibration frequency by varying the rotational speed of the mentioned eccentric weight in response to a control signal conveyed from computer 74 by the third electrical output conduit 78C.

If it is desired to adjust the bed tilt angle of the shaker apparatus 32B, that is the angle of the screen 84 relative to the horizontal that can be done as follows. The shaker apparatus 32B can have one end pivotally mounted as indicated at 96 with the other end thereof being adjustably supported by a hydraulic ram 98. A third automatic control means 100. which may be an electrically operated hydraulic valve, controls flow of hydraulic fluid to ram 98 through hydraulic fluid supply line 102 in response to a control signal conveyed by fourth electrical output conduit 78D.

It will be appreciated that the automatic control means 100 may be a part of the same assembly as, or may be considered generally to include the associated apparatus such as the ram 98 which mechanically adjusts the shaker apparatus 32B in response to the control signal conveyed by fourth electrical output conduit 78D.

Referring now to FIG. 3, a fourth automatic control means 104 is schematically illustrated for controlling a bed length of the shaker apparatus 32B.

In FIG. 3, the shaker screen 84 has its upper end 106 fixedly attached to the shaker frame 82 and has a variable position lower end defined by engagement of a roller 108 with a flexible lower end portion of the screen 84. For example, the screen 84 may have an operational portion 110 defined between the upper end 106 and the roller 108, and an available additional portion 112 defined between roller 108 and a tension weight 114. A tension spring may also be substituted for weight 114.

To vary the length of the operational portion 110 of screen 84, a ram 116 is extended to move roller 108 so that operational portion 110 of screen 84 is lengthened and the available portion 112 of screen 84 is shortened.

The movement of ram 116 is provided in response to a control signal conveyed from the computer 74 to the fourth automatic control means 104, which may be an electrically operated hydraulic valve, through fifth electrical output conduit 78E to control a flow of hydraulic fluid through hydraulic conduit 118.

Finally, in FIG. 4, which is a width-wise cross-sectional elevation schematic view of the shaker apparatus 32B, a means is illustrated for controlling a screen tension of the shaker means 32B.

In FIG. 4, the screen 84 is shown as being supported by one or more transverse flexible arch-shaped beams 120 attached to the sides of the frame 82 as indicated at 122 and 124.

A hydraulic ram 126 is connected at 128 to a mid point of the flexible beam 120.

In order to increase the tension on the screen 84, the ram 126 can be extended thus tending to stretch or tension the screen 84 in a transverse direction. The screen 84 is of course attached to the side walls of the frame 82.

The ram 126 is controlled by a fifth automatic control means 130, which may be an electrically actuated hydraulic valve, which acts in response to a control signal conveyed by the sixth electrical output conduit 78F to control the flow of hydraulic fluid through a hydraulic fluid supply line 132.

The present invention also provides a measuring means 134 operably associated with the shaker means 32 for actually measuring a size of the rock particles delivered by the stream of drilling fluid to the shaker means 32. For example, as schematically illustrated in FIG. 2, the measuring means 134 may take the form of an in-line size analyzer 134 placed in the conduit 30 through which the stream of drilling fluid is supplied to the shaker means 32.

An input signal generated by the in-line size analyzer 134 is provided through electrical input conduit 136 to computer 74. The computer 74 is programmed to calculate a control signal in response to the input signal from in-line size analyzer 134 which control signal correlates to a measured size of the rock particles being carried in the stream of drilling fluid in fluid conduit 30.

The computer 74 then transmits the generated control signal to various ones of the automatic control means 80, 94, 100, 104 or 130 previously described so as to further adjust the shaker means 32 in response to this control signal and to further increase the separation of rock particles by the shaker means 32.

It is also anticipated that it may be desirable to adjust the shaker means 32 in response to a measurement of mass flow rate of material being delivered to the shaker system 32.

For example, an indication of the mass flow rate to the shaker system 32 could be determined by means of a load cell 150 for measuring the weight of the shaker means 32B on a timed basis, and a signal generated thereby may be transmitted through electrical input conduit 152 to the computer 74. The computer 74 can be programmed to generate a control signal responsive to the input signal from load cell 150, which control signal can then be transmitted through one of the electrical output conduits 78 to any one of the various automatic control means for the shaker 32B previously described. For example, if the load cell 150 detects a substantial increase in the mass flow rate of material reaching the shaker means 32B, it may be desirable to extend the operational length 110 of shaker screen 84 as previously described with regard to FIG. 3.

The monitoring of the mass flow rate of material being delivered to the shaker means 32 can also provide other valuable information about the well drilling operation. For example, if the load cell 150 indicates that much more material is being generated than would be expected from the power input to the drilling system, it is apparent that the hole is collapsing. This information can be correlated to the time that the increase is detected so as to help pinpoint the location in the well bore where the collapse occurred. This can assist in subsequent remedial operations to properly calculate the cement volume and to properly calculate well bore enlargement for correcting well logs. Also, adjustments can be made to various operating parameters to minimize the well bore enlargement.

Also, a second load cell (not shown) could be placed under shale slide 40 to measure the discarded mass which information could be used in a similar fashion to that just described for load cell 150.

It should be noted that in the broadest sense of the terminology, both the in-line size analyzer 134 and the load cell 150 may be generally described as being monitoring means for monitoring operational parameters of the well drilling system 10, and may thus be included in the meaning of the monitoring system means 60 previously described.

General Operational Description

The operation of the present invention as utilized with a rotary drilling system like that illustrated in FIG. 1 can generally be described as follows. It is noted that although the invention has been illustrated and described in connection with use of a rotary cone drill bit 12, it also of course encompasses use of other types of bits such as diamond bits.

The well bore 18 is drilled into the subsurface formation 16 with the rotary drilling system 10. During the drilling operation a stream of drilling fluid is circulated through the rotary drilling system 10 to carry rock particles away from the bottom 26 of the bore hole 18 as the bore hole 18 is formed.

This stream of drilling fluid with the rock particles carried therein is passed through the shaker system 32 for separating rock particles from the drilling fluid.

The monitoring system means 60 is used to monitor a value of at least one, and preferably a plurality of operating parameters of the rotary drilling system 10, which parameter or parameters correlate to an average size of the rock particles being generated during drilling.

The shaker system 32 is then adjusted in response to these monitored values, and more particularly in response to control signals generated by the computer 74 based upon these monitored values. This adjustment of the shaker system is done so as to increase separation of the rock particles from the stream of drilling fluid. Most preferably, the system of the present invention is utilized at early stages of drilling to predict the average size of the rock particles being generated. By predicting the average size of the rock particles being generated before those particles reach the shaker system 32, and subsequently adjusting the shaker system 32 so as to tend to optimize separation therein of particles having the predicted average size, a separation of rock particles in the shaker system 32 on the first pass therethrough is improved.

Typically wells will range up to several miles in depth, and typical velocities of the drilling mud and suspended particles through the well annulus 22 are generally in the range of 80 to 160 feet per minute, so that there may be a lag time of many minutes or even several hours between generation of the rock particles and the time the rock particles reach the shaker means 32.

It will be appreciated by those skilled in the art that the preferred operation of a shaker apparatus such as shaker apparatus 32 is to remove all of the rock particles generated during drilling from the drilling fluid, without removing any significant part of the fine suspended particles which are desired to be retained in the drilling fluid for recirculation, namely particles of barite and other solid additives which are typically used in drilling fluids to control drilling fluid density and the like.

Furthermore, the more material that can be separated in the shaker system 32, the less need there is for use of downstream solids treatment equipment such as for example the desander 54 and desilter 56 previously mentioned with regard to FIG. 1.

In some instances, the removal of rock particles by the shaker system 32 can be further optimized or improved by subsequently measuring the size of rock particles which are actually being delivered to the shaker 32 such as by use of the in-line size analyzer 134 previously described. Then based upon this measured rock size, the shaker apparatus 32 can be further adjusted to further increase the separation of rock particles provided thereby.

Thus it is seen that the apparatus and methods of the present invention readily achieve the ends and advantages mentioned as well as those inherent therein. While certain preferred embodiments of the invention have been described and illustrated for purposes of the present disclosure, numerous changes in the arrangement of elements and steps may be made by those skilled in the art, which changes are encompassed within the scope and spirit of the present invention as defined by the appended claims.

What is claimed is:

1. A method of separating rock particles from a stream of drilling fluid while drilling a well, comprising:
   (a) drilling into a subsurface formation with a rotary drilling system to from a wellbore;
   (b) circulating said stream of drilling fluid through said rotary drilling system to carry said rock particles away from a bottom of said wellbore as said wellbore is formed;
   (c) passing said stream of drilling fluid, with said rock particles being carried therein, through a shaker system for separating said rock particles from said drilling fluid;
   (d) monitoring a value of at least one operating parameter of said rotary drilling system which parameter correlates to an average size of said rock particles; and
   (e) automatically adjusting said shaker system, in response to said monitored value of said operating parameter, to increase separation of said rock particles by said shaker system.

2. The method of claim 1, wherein:
   step (d) is further characterized in that said value of said operating parameter is monitored prior to a time that said rock particles correlating thereto pass through said shaker system; and
   step (e) is further characterized in that said shaker system is adjusted prior to a time that said rock particles correlating to said monitored value of said operating parameter reach said shaker system so that a separation of rock particles on a first pass through said shaker system is increased.

3. The method of claim 1, wherein:
   step (d) is further characterized as:
   (1) monitoring values of a plurality of operating parameters from which values said average size of said rock particles can be estimated; and
   (2) computing from said monitored values a control signal which correlates to an estimated average size of said rock particles; and
   step (e) is further characterized as adjusting said shaker system in response to said control signal to increase separation of said rock particles by said shaker system.

4. The method of claim 3, wherein:
   step (d)(1) is further characterized in that a power input to said rotary drilling system can be approximated from said monitored values of said plurality of operating parameters; and
   step (d)(2) is further characterized in that said control signal is computed based upon a predetermined relationship between said power input and said estimated average size of said rock particles.

5. The method of claim 4, wherein:

step (d)(1) is further characterized in that said plurality of monitored operating parameters includes weight on bit, rotational speed, and torque of said drilling system, whereby a mechanical bit power input can be approximated.

6. The method of claim 5, wherein:
step (d)(1) is further characterized in that said plurality of monitored operating parameters includes drilling fluid density and drilling fluid flow rate of said drilling system, whereby a hydraulic bit power input can be approximated.

7. The method of claim 4, wherein:
step (d)(1) is further characterized in that said plurality of monitored operating parameters includes drilling fluid density and drilling fluid flow rate of said drilling system, whereby a hydraulic bit power input can be approximated.

8. The method of claim 4, wherein:
step (d)(2) is further characterized in that said predetermined relationship includes a correction factor to account for a difference between power input to the drilling system and power output which is actually available to create and remove said rock particles, said difference being due at least in part to power losses experienced during the drilling of said well.

9. The method of claim 8, wherein:
step (d)(2) is further characterized in that said correction factor is a calculated correction factor which is calculated as a function of depth for the particular well being drilled and takes into account the rock properties of the various formations expected to be encountered as the particular well is drilled.

10. The method of claim 9, wherein:
step (d)(1) is further characterized in that said plurality of operating parameters includes parameters from which both mechanical bit power input and hydraulic bit power input can be approximated.

11. The method of claim 4, wherein:
step (d)(1) is further characterized in that said plurality of operating parameters includes parameters from which both mechanical bit power input and hydraulic bit power input can be approximated.

12. The method of claim 3, wherein:
step (d)(1) is further characterized in that said plurality of monitored operating parameters includes weight on bit, rotational speed, and torque of said drilling system, whereby a mechanical bit power input can be approximated.

13. The method of claim 3, wherein:
step (d)(1) is further characterized in that said plurality of monitored operating parameters includes drilling fluid density and drilling fluid flow rate of said drilling system, whereby a hydraulic bit power input can be approximated.

14. The method of claim 3, wherein:
step (d)(1) is further characterized in that a power output of said rotary drilling system can be approximated from said monitored values of said plurality of operating parameters; and
step (d)(2) is further characterized in that said control signal is computed based upon a predetermined relationship between said power output and said estimated average size of said rock particles.

15. The method of claim 14, wherein:
step (d)(1) is further characterized in that said plurality of operating parameters includes parameters from which both a power output due to bit hydraulic jet action and a power output due to heating caused by bit friction and impact can be approximated.

16. The method of claim 15, wherein:
step (d)(1) is further characterized in that said plurality of monitored operating parameters includes drilling fluid flow rate, weight on bit, rate of penetration, rotational speed, torque and pump pressure of said drilling system, whereby said power output due to said bit hydraulic jet action can be approximated.

17. The method of claim 1, wherein:
step (e) is further characterized as adjusting vibration amplitude of said shaker system.

18. The method of claim 1, wherein:
step (e) is further characterized as adjusting vibration frequency of said shaker system.

19. The method of claim 1, wherein:
step (e) is further characterized as adjusting a bed tilt angle of said shaker system.

20. The method of claim 1, wherein:
step (e) is further characterized as adjusting a bed length of said shaker system.

21. The method of claim 1, wherein:
step (e) is further characterized as adjusting a screen tension of said shaker system.

22. The method of claim 1, wherein:
step (e) is further characterized as adjusting a screen opening size of said shaker system.

23. The method of claim 1, further comprising steps of:
(f) after step (e), measuring a size of rock particles delivered by said stream of drilling fluid to said shaker system; and
(g) further adjusting said shaker system, in response to the rock particle size measured in step (f), to further increase separation of said rock particles by said shaker system.

24. The method of claim 23, wherein:
step (d) is further characterized in that said value of said operating parameter is monitored prior to a time that said rock particles correlating thereto pass through said shaker system; and
step (e) is further characterized in that said shaker system is adjusted prior to a time that said rock particles correlating to said monitored value of said operating parameter reach said shaker system so that a separation of rock particles on a first pass through said shaker system is increased.

25. A shaker control system for well drilling, comprising:
monitoring system means for monitoring a value of at least one operating parameter of a well drilling system, which parameter correlates to an average size of rock particles being created during drilling of a well;
computing means, operably associated with said monitoring system means, for computing a control signal which correlates to an estimated average size of said rock particles;
adjustable shaker means for separating said rock particles from a stream of drilling fluid passing therethrough; and
automatic control means, operably associated with said computing means and said adjustable shaker means, for automatically adjusting said shaker means in response to said control signal to increase separation of said rock particles be said shaker means.

26. The system of claim 25, wherein:
said monitoring system means is further characterized as a means for monitoring values of a plurality of operating parameters from which a power input to said rotary drilling system can be approximated; and
said computing means is further characterized as a means for computing said control signal based upon a predetermined relationship between said power input and said estimated average size of said rock particles.

27. The system of claim 25, wherein said monitoring system means further includes:
first individual monitoring means for monitoring a value of weight on bit;
second individual monitoring means for monitoring a value of rotational speed; and
third individual monitoring means for monitoring a value of torque.

28. The system of claim 27 wherein said monitoring system means further includes:
fourth individual monitoring means for monitoring a value of drilling fluid density; and
fifth individual monitoring means for monitoring a value of drilling fluid flow rate.

29. The system of claim 25, wherein:
said monitoring system means is further characterized as a means for monitoring values of a plurality of operating parameters from which a power output of said rotary drilling system can be approximated; and
said computing means is further characterized as a means for computing said control signal based upon a predetermined relationship between said power output and said estimated average size of said rock particles.

30. The system of claim 29, wherein said monitoring system means further includes:
first individual monitoring means for monitoring a value of weight on bit;
second individual monitoring means for monitoring a value of rotational speed;
third individual monitoring means for monitoring a value of torque;
fourth individual monitoring means for monitoring drilling fluid flow rate;
fifth individual monitoring means for monitoring rate of penetration; and
sixth individual monitoring means for monitoring pump pressure.

31. The system of claim 25, wherein:
said automatic control means is further characterized as a means for controlling vibration amplitude of said shaker means.

32. The system of claim 25, wherein:
said automatic control means is further characterized as a means for controlling vibration frequency of said shaker means.

33. The system of claim 25, wherein:
said automatic control means is further characterized as a means for controlling a bed tilt angle of said shaker means.

34. The system of claim 25, wherein:
said automatic control means is further characterized as a means for controlling a bed length of said shaker means.

35. The system of claim 25, wherein:
said automatic control means is further characterized as a means for controlling a screen tension of said shaker means.

36. The system of claim 25, wherein:
said automatic control means is further characterized as a means for controlling a screen opening size of said shaker means.

37. The system of claim 25, further comprising:
measuring means, operably associated with said shaker means, for measuring a size of rock particles delivered by said stream of drilling fluid to said shaker means; and wherein
said computing means is further characterized as being operably associated with said measuring means and as being a means for computing a second control signal which correlates to a measured size of said rock particles; and
said automatic control means is further characterized as a means for further adjusting said shaker means in response to said second control signal to further increase separation of said rock particles by said shaker means.

* * * * *

UNITED STATES PATENT AND TRADEMARK OFFICE
CERTIFICATE OF CORRECTION

PATENT NO. : 4,809,791
DATED : March 7, 1989
INVENTOR(S) : Asadollah Hayatdavoudi It is certified that error appears in the above-identified patent and that said Letters Patent is hereby corrected as shown below:

Column 2, line 60, delete "2" and insert --20-- therefor.

Column 16, line 19, delete "from" and insert --form-- therefor.

Column 19, line 1, delete "be" and insert --by-- therefor.

Signed and Sealed this

Tenth Day of October, 1989

Attest:

DONALD J. QUIGG

*Attesting Officer*  *Commissioner of Patents and Trademarks*